(12) United States Patent
Kitahara et al.

(10) Patent No.: US 10,771,832 B2
(45) Date of Patent: Sep. 8, 2020

(54) INFORMATION PROCESSING APPARATUS, INFORMATION PROCESSING METHOD, PROGRAM, APPLICATION INFORMATION TABLE SUPPLYING APPARATUS, AND APPLICATION INFORMATION TABLE SUPPLYING METHOD

(71) Applicant: Saturn Licensing LLC, New York, NY (US)

(72) Inventors: Jun Kitahara, Saitama (JP); Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/365,140

(22) PCT Filed: Nov. 22, 2012

(86) PCT No.: PCT/JP2012/007527
§ 371 (c)(1),
(2) Date: Jun. 13, 2014

(87) PCT Pub. No.: WO2013/099101
PCT Pub. Date: Jul. 4, 2013

(65) Prior Publication Data
US 2014/0344884 A1  Nov. 20, 2014

(30) Foreign Application Priority Data

Dec. 27, 2011  (JP) ................................. 2011-286944

(51) Int. Cl.
*H04N 21/262* (2011.01)
*H04N 21/434* (2011.01)
(Continued)

(52) U.S. Cl.
CPC ...... *H04N 21/26283* (2013.01); *H04H 20/93* (2013.01); *H04H 60/82* (2013.01);
(Continued)

(58) Field of Classification Search
CPC ............. H04N 21/4432; H04N 21/482; H04N 21/8173; H04N 21/8543; H04N 21/8545;
(Continued)

(56) References Cited

U.S. PATENT DOCUMENTS

| | | | |
|---|---|---|---|
| 7,028,327 B1 | 4/2006 | Dougherty et al. | |
| 7,228,557 B1 * | 6/2007 | Korehisa ................ | H04H 20/81 348/E7.063 |

(Continued)

FOREIGN PATENT DOCUMENTS

| | | |
|---|---|---|
| CN | 102045597 | 5/2011 |
| EP | 1 085 758 A2 | 3/2001 |

(Continued)

OTHER PUBLICATIONS

ETSI (European Telecommunications Standards Institute), "ETSI TS 102 796 V1.1.1 (Jun. 2010)"http://www.etsi.org/deliver/etsi_ts/102700_102799/102796/01.01.01_60/ts_102796v010101p.pdf(browsed on Oct. 21, 2011).

(Continued)

*Primary Examiner* — Mulugeta Mengesha
*Assistant Examiner* — Alazar Tilahun
(74) *Attorney, Agent, or Firm* — Oblon, McClelland, Maier & Neustadt, L.L.P.

(57) ABSTRACT

[Object] To stably supply an application processed together with broadcast content.
[Solving Means] An information processing apparatus includes a broadcast content processing unit that receives and processes broadcast content, and a controller that acquires, for each request for acquiring an application
(Continued)

randomized latency descriptor

| | No. of Bits | Identifier |
|---|---|---|
| randomized_latency_descriptor () { | | |
| descriptor_tag | 8 | uimsbf |
| descriptor_length | 8 | uimsbf |
| range | 8 | uimsbf |
| rate | 8 | uimsbf |
| | 8 | uimsbf |
| for(i=0; i<N; i++) { | | |
| hash_value_byte | 8 | uimsbf |
| } | | |
| } | | | capable of being processed together with the broadcast content from a server, an application information table in which first information for calculating a random timing is stored, and calculates, based on the first information, a timing at which the request for acquiring the application is transmitted.

11 Claims, 15 Drawing Sheets

(51) Int. Cl.
| | |
|---|---|
| *H04N 21/27* | (2011.01) |
| *H04N 21/47* | (2011.01) |
| *H04H 60/82* | (2008.01) |
| *H04H 20/93* | (2008.01) |
| *H04N 21/435* | (2011.01) |
| *H04N 21/239* | (2011.01) |
| *H04N 21/437* | (2011.01) |
| *H04N 21/81* | (2011.01) |
| *H04N 21/278* | (2011.01) |

(52) U.S. Cl.
CPC ....... *H04N 21/2396* (2013.01); *H04N 21/437* (2013.01); *H04N 21/4345* (2013.01); *H04N 21/4351* (2013.01); *H04N 21/8166* (2013.01); *H04H 2201/40* (2013.01); *H04N 21/278* (2013.01)

(58) Field of Classification Search
CPC ............... H04N 21/84; H04N 21/2405; H04N 21/25808; H04N 21/26241; H04N 21/26283; H04N 7/165; H04N 1/00244; H04N 1/00933; H04N 21/47214; H04N 21/4821; H04N 21/00; H04N 21/20; H04N 21/8166; H04N 21/437; H04N 21/2396; H04N 21/4345; H04N 21/4351; H04H 20/93; H04H 60/82; H04H 2201/40

See application file for complete search history.

(56) References Cited

U.S. PATENT DOCUMENTS

| | | | |
|---|---|---|---|
| 7,584,491 B2 | 9/2009 | Bruckner et al. | |
| 8,271,654 B2* | 9/2012 | Kim | H04N 21/235 386/248 |
| 8,407,752 B2 | 3/2013 | Levy et al. | |
| 2008/0133728 A1 | 6/2008 | Nimour | |
| 2008/0141327 A1* | 6/2008 | Oh | H04N 21/235 725/131 |
| 2008/0276300 A1* | 11/2008 | Terao | 726/3 |
| 2009/0144793 A1* | 6/2009 | Lin | H04N 21/23614 725/116 |
| 2010/0088734 A1 | 4/2010 | Dewa et al. | |
| 2010/0107181 A1* | 4/2010 | Kim | H04N 21/235 719/320 |
| 2011/0093895 A1* | 4/2011 | Lee et al. | 725/40 |
| 2012/0174170 A1 | 7/2012 | Dewa et al. | |
| 2012/0331513 A1 | 12/2012 | Yamagishi et al. | |
| 2013/0297727 A1 | 11/2013 | Levy | |
| 2013/0347030 A1* | 12/2013 | Oh | H04N 21/478 725/32 |

FOREIGN PATENT DOCUMENTS

| | | |
|---|---|---|
| JP | 2002-232374 A | 8/2002 |
| JP | 2005/12545 | 1/2005 |
| JP | 2006/113698 | 4/2006 |
| JP | 2007-201623 A | 8/2007 |
| JP | 2008-501255 A | 1/2008 |
| JP | 2008/097314 | 4/2008 |
| JP | 2010-/262452 | 11/2010 |
| JP | 2011-066556 A | 3/2011 |
| WO | WO 2011/088257 | 7/2011 |

OTHER PUBLICATIONS

Association of Radio Industries and Businesses, "Application Execution Engine Platform for Digital Broadcasting standard ARIB-STD-B23 version 1.2", http://www.arib.or.jp/english/html/overview/doc/2-STD-B23v1_2.pdf (browsed on Oct. 21, 2011).

International Search Report from International Publication PCT/JP2012/007527 dated Dec. 25, 2012.

European Office Action dated Aug. 28, 2017 in Patent Application No. 12 863 245.2.

"Digital Video Broadcasting (DVB); Signalling and carriage of interactive applications and services in Hybrid broadcast/broadband environments", ETSI TS 102 809 V1.1.1, https://www.etsi.org/deliver/etsi_ts/102800_102899/102809/01.01.01_60/ts_102809v010101p.pdf, XP055120418, Jan. 2010, pp. 1-98.

\* cited by examiner

| application_information_section() { | No. of bits | Identifier |
|---|---|---|
| table_id | 8 | uimsbf |
| section_syntax_indicator | 1 | bslbf |
| reserved_future_use | 1 | bslbf |
| reserved | 2 | bslbf |
| section_length | 12 | uimsbf |
| test_application_flag | 1 | bslbf |
| application_type | 15 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| reserved_future_use | 4 | bslbf |
| common_descriptors_length | 12 | uimsbf |
| for(i=0;i<N;i++){ | | |
| descriptor() | | |
| } | | |
| reserved_future_use | 4 | bslbf |
| application_loop_length | 12 | uimsbf |
| for(i=0;i<N;i++){ | | |
| application_identifier() | | |
| application_control_code | 8 | uimsbf |
| reserved_future_use | 4 | bslbf |
| application_descriptors_loop_length | 12 | uimsbf |
| for(j=0;j<N;j++){ | | |
| descriptor() | | |
| } | | |
| } | | |
| CRC_32 | 32 | rpchof |
| } | | |

FIG.2

| Field | | Description |
|---|---|---|
| appName | | Application name |
| applicationIdentifier | | ID for uniquely identifying application |
| applicationDescriptor | | General-purpose descriptor common to applications |
| | type | Designate application type |
| | controlCode | Designate value of application_control_code |
| | visibility | Designate visibility of application |
| | serviceBound | Flag indicating validity in only current service |
| | priority | Indicate priority of application |
| | version | Version of application |
| | mhpVersion | Version conforming to platform profile |
| | icon | Designate icon |
| | storageCapability | Capability of storage function |
| applicationTransport | | Transport protocol descriptor |
| applicationLocation | | Application location descriptor |
| applicationBoundary | | Application boundary descriptor |
| applicationSpecificDescriptor | | Application specific descriptor |
| applicationUsageDescriptor | | Application usage descriptor |
| randomizedLatencyDescriptor | | Randomized latency descriptor |

FIG.3 randomized latency descriptor

| | No. of Bits | Identifier |
|---|---|---|
| randomized_latency_descriptor () { | | |
| descriptor_tag | 8 | uimsbf |
| descriptor_length | 8 | uimsbf |
| range | 8 | uimsbf |
| rate | 8 | uimsbf |
| for(i=0; i<N; i++) { | | |
| hash_value_byte | 8 | uimsbf |
| } | | |
| } | | |

FIG.4

| Code | Identification name | Meaning |
|---|---|---|
| 0x00 | | reserved_future_use |
| 0x01 | AUTOSTART | When service is selected, application is automatically activated (except for case where application is already in execution). |
| 0x02 | PRESENT | While service is being selected, application is in executable state but is not automatically activated. |
| 0x03 | DESTROY | Application terminates processing. |
| 0x04 | KILL | Application immediately terminates processing. |
| 0x05 | PREFETCH | Application file group is cached if receiver is available. Application is not started. |
| 0x06 | REMOTE | Indicate that application is not in current transport stream and can be acquired when channel of different stream is selected |
| 0x07 | DISABLED | Indicate that application is incapable of being activated. |
| 0x08 | PLAYBACK_AUTOSTART | When receiver executes reproduction from storage device, application is activated as in AUTOSTART |
| 0x09 to 0xFF | | reserved_future_use |

FIG.5

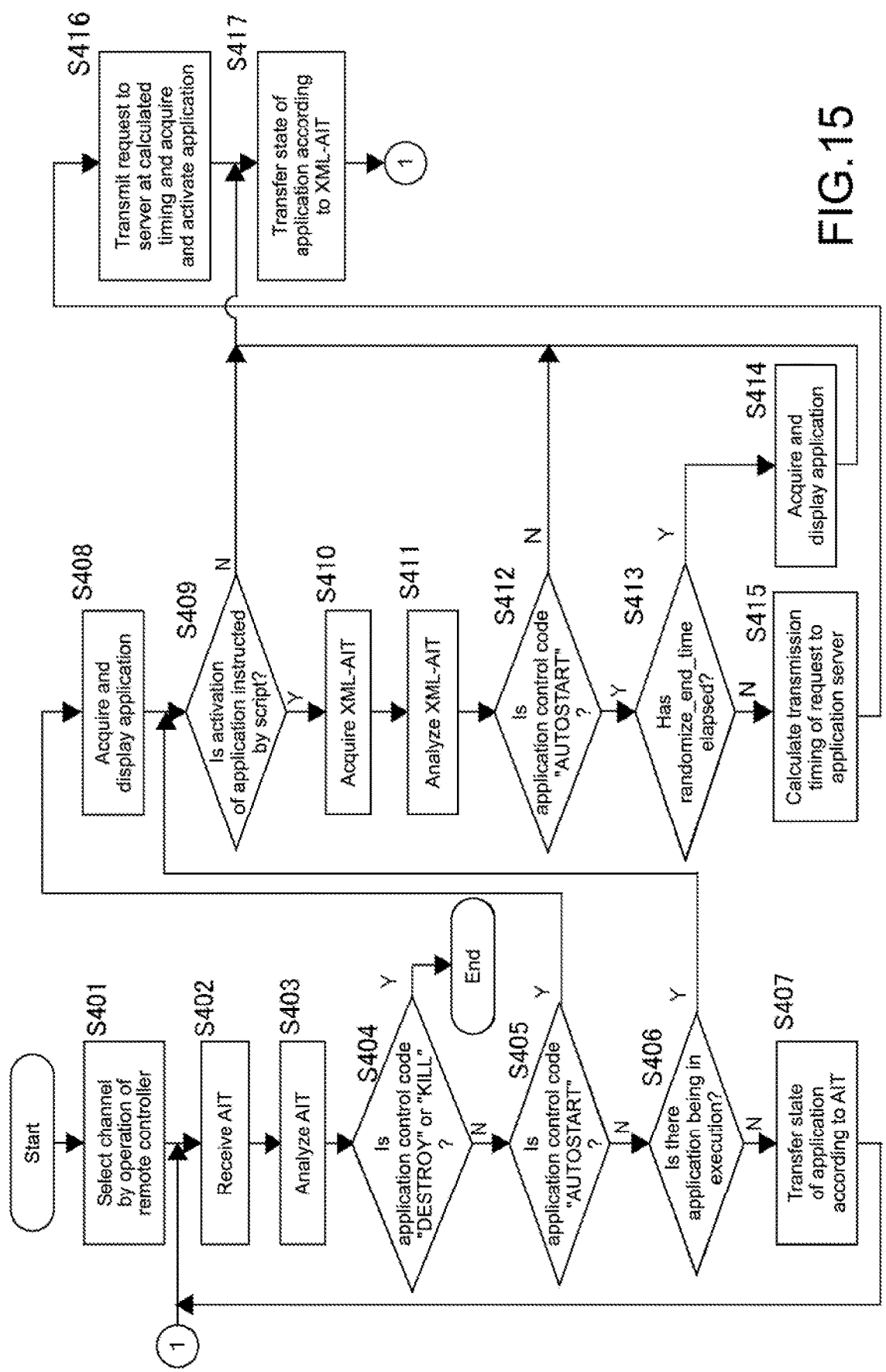

INFORMATION PROCESSING APPARATUS, INFORMATION PROCESSING METHOD, PROGRAM, APPLICATION INFORMATION TABLE SUPPLYING APPARATUS, AND APPLICATION INFORMATION TABLE SUPPLYING METHOD

CROSS-REFERENCE TO RELATED APPLICATION

The present application is a national phase entry under 35 U.S.C. § 371 of International Application No. PCT/JP2012/007527 filed Nov. 22, 2012, published on Jul. 4, 2013 as WO 2013/099101 A1, which claims priority from Japanese Patent Application No. JP 2011-286944 filed in the Japanese Patent Office on Dec. 27, 2011.

TECHNICAL FIELD

The present technology relates to an information processing apparatus, an information processing method, a program, an application information table supplying apparatus, and an application information table supplying method that are capable of executing an application associated with broadcast content by using an application management table.

BACKGROUND ART

In recent years, there has been known a technology capable of executing an application delivered via a network such as the Internet simultaneously with the reproduction of broadcast content. As such a technology, a technology called Hybrid Broadcast Broadband TV (hereinafter, referred to as HbbTV) is known. As the standard of the HbbTV, "ETSI TS 102 796" (see Non-patent Document 1) is developed in Europe. Additionally, also in Japan, a standard "ARIB STD-B23" (see Non-patent Document 2) according to the "ETSI TS 102 796" is developed.

Non-patent Document 1: ETSI (European Telecommunications Standards Institute), "ETSI TS 102 796 V1.1.1 (2010-06)", http://www.etsi.org/deliver/etsi_ts/102700_102799/10279 6/01.01.01_60/ts_102796v010101p.pdf (browsed on Oct. 21, 2011)

Non-patent Document 2: Association of Radio Industries and Businesses, "Application Execution Engine Platform for Digital Broadcasting standard ARIB STD-B23 version 1.2", http://www.arib.or.jp/english/html/overview/doc/2-STD-B23v1_2.pdf (browsed on Oct. 21, 2011)

SUMMARY OF INVENTION

Problem to be solved by the Invention

For example, in a system in which an application is executed simultaneously with the reproduction of broadcast content, such as the HbbTV, a life cycle from the activation to the end of the application is managed by a data structure called AIT (Application Information Table) section that is superimposed on the broadcast content. An information terminal that has acquired an AIT section accesses a server (application server) in which the application is stored, based on location information of an application that is included in the AIT section, acquires that application, and subsequently controls the application based on an application control code described in the AIT section.

The AIT section acquired from broadcast is concurrently acquired in an information processing apparatus of each user. For that reason, acquisition requests for an application from the information processing apparatuses of the respective users to the application server tend to be concentrated in a short period of time. When a huge amount of the acquisition requests for an application to the application server is concentrated in a short period of time in such a manner, due to the increased load of the application server, in the worst case, there may be a possibility that the server is brought down and the application cannot be provided to the users.

In view of the circumstances as described above, it is an object of the present technology to provide an information processing apparatus, an information processing method, a program, an application information table supplying apparatus, and an application information table supplying method that are capable of stably supplying an application processed together with broadcast content.

Means for Solving the Problem

To solve the problems described above, according to the present technology, there is provided an information processing apparatus including: a broadcast content processing unit that receives and processes broadcast content; and a controller that acquires, for each request for acquiring an application capable of being processed together with the broadcast content from a server, an application information table in which first information for calculating a random timing is stored, and calculates, based on the first information, a timing at which the request for acquiring the application is transmitted.

In the application information table, second information on a valid period of processing based on the first information may be stored, and the controller may determine, based on the second information, on or off of execution of the processing based on the first information.

The controller may determine whether the valid period of the processing has elapsed or not based on the second information, and when the valid period has elapsed, cancel the processing based on the first information and transmit the request for acquiring the application.

According to the present technology, there is provided an information processing method including: receiving and processing, by a broadcast content processing unit, broadcast content; and acquiring, by a controller, for each request for acquiring an application capable of being processed together with the broadcast content from a server, an application information table in which first information for calculating a random timing is stored, and calculating, based on the first information, a timing at which the request for acquiring the application is transmitted.

According to the present technology, there is provided a program causing a computer to function as: a broadcast content processing unit that receives and processes broadcast content; and a controller that acquires, for each request for acquiring an application capable of being processed together with the broadcast content from a server, an application information table in which first information for calculating a random timing is stored, and calculates, based on the first information, a timing at which the request for acquiring the application is transmitted.

According to the present technology, there is provided an application information table supplying apparatus including a supply unit that supplies an application information table to an information processing apparatus for each request for acquiring an application capable of being processed together with broadcast content from a server, the application information table storing first information for causing the information processing apparatus to calculate a random timing.

According to the present technology, there is provided an application information table supplying method including supplying, by a supply unit, an application information table to an information processing apparatus for each request for acquiring an application capable of being processed together with broadcast content from a server, the application information table storing first information for causing the information processing apparatus to calculate a random timing.

Effect of the Invention

As described above, according to the present technology, it is possible to stably supply an application processed together with broadcast content.

BRIEF DESCRIPTION OF DRAWINGS

FIG. 2 is a diagram showing the data structure of an AIT section.

FIG. 3 is a diagram showing the data structure of an XML-AIT.

FIG. 4 is a diagram showing the data structure of a randomized latency descriptor.

FIG. 5 is a diagram showing the definitions of application control codes designated by the AIT section and the XML-AIT.

FIG. 15 is a flowchart of the operation example shown in FIG. 14.

MODE(S) FOR CARRYING OUT THE INVENTION

Hereinafter, an embodiment of the present technology will be described with reference to the drawings.

First Embodiment

Information Processing System

Figure 1:
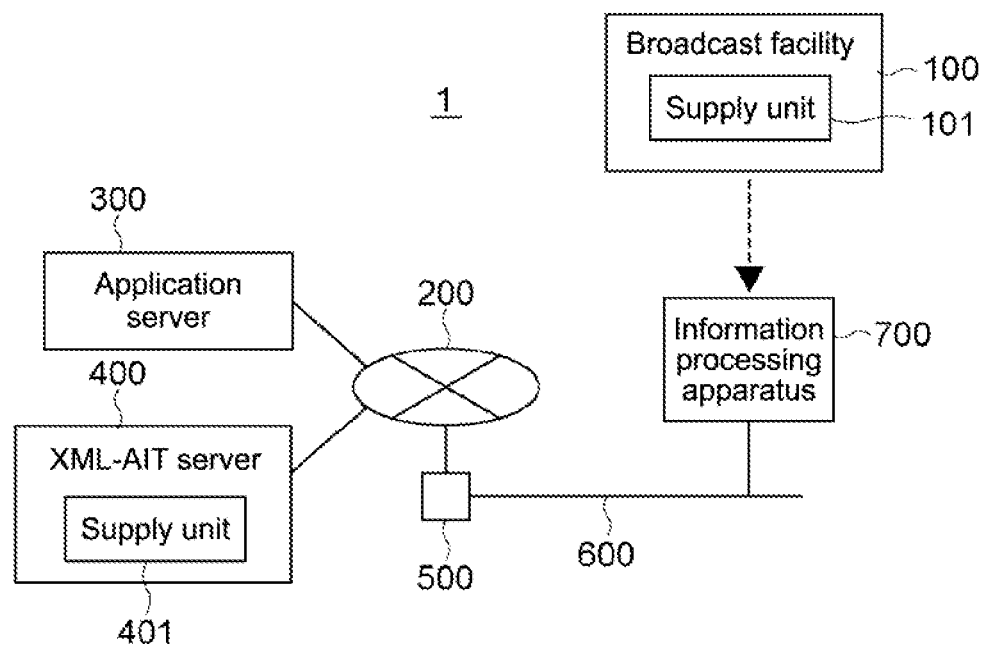
FIG. 1 is a diagram showing the general outline of an information processing system of this embodiment.

FIG. 1 is a diagram showing the general outline of an information processing system of this embodiment.

An information processing system 1 of this embodiment includes a broadcast facility 100, a first network 200 such as the Internet, an application server 300, an XML-AIT server 400, an edge router 500, a second network 600 such as a LAN (Local Area Network), and an information processing apparatus 700.

The broadcast facility 100 (application information table supplying apparatus) transmits a digital broadcast signal via, for example, communication media such as ground waves, satellite waves, and an IP (Internet Protocol) network. The broadcast facility 100 sends an AV stream, into which streams of videos, voices, subtitles, and the like are multiplexed, and a so-called broadcast stream, on which data accompanying the AV stream and the like are superimposed. The data accompanying the AV stream includes markup languages such as HTML and BML, an application described in a scripting language such as a Java (registered trademark) script, an AIT (Application Information Table) section constituted of information for managing an application, and the like. That is, the broadcast facility 100 includes a supply unit 101 that supplies the AIT section to the information processing apparatus 700.

The application server 300 is capable of being connected to the first network 200 and provides an application, which is processed together with the broadcast stream, to the information processing apparatus 700 via the first network 200.

The XML-AIT server 400 (application information table supplying apparatus) is capable of being connected to the first network 200 and delivers an XML (Extensible Markup Language)-AIT for managing an application, which is provided from the application server 300, to the information processing apparatus 700 via the first network 200. That is, the XML-AIT server 400 includes a supply unit 401 that supplies the XML-AIT to the information processing apparatus 700.

It should be noted that the application server 300 and the XML-AIT server 400 may be one server. Those servers are each constituted of a typical computer system. Specifically, those servers each include a CPU (Central Processing Unit), a main memory, storage, a user interface, and the like. The main memory stores a program for causing the computer system to operate so as to supply the XML-AIT to the information processing apparatus 700, and the like, and the CPU executes the program to serve as the supply unit 401 that supplies the XML-AIT to the information processing apparatus 700.

The edge router 500 is a router for connecting the first network 200 and the second network 600. The second network 600 may be wired or wireless.

The information processing apparatus 700 is, for example, a personal computer, a mobile phone, a smartphone, a television apparatus, a game device, a tablet terminal, an audio-video reproduction device, or the like, but a specific product form is not determined.

The information processing apparatus 700 receives the digital broadcast signal from the broadcast facility 100 and modulates the digital broadcast signal to acquire a transport stream. The information processing apparatus 700 can separate a broadcast stream from this transport stream and decode the broadcast stream to be output to a display unit (not shown) and a speaker unit (not shown), or a recording apparatus (not shown) connected to the information processing apparatus 700.

It should be noted that each of the display unit, the speaker unit, and the recording apparatus may be incorporated in the information processing apparatus 700 or may be connected, as devices independent from each other, to the information processing apparatus 700 directly or via the second network 600. Alternatively, a device (not shown) including the display unit and the speaker unit may be connected to the information processing apparatus 700 directly or via the second network 600.

Further, the information processing apparatus 700 can extract an application and PSI/SI (Program Specific Information/Service Information) including the AIT section from the acquired transport stream and interpret the AIT section to perform control of the application. In the case where the application is a visible application, the information processing apparatus 700 can combine a video signal generated by the execution of this application with video and subtitle signals of the broadcast content described above to be output to the display unit.

Furthermore, the information processing apparatus 700 can acquire an application from the application server 300 via the first network 200, the edge router 500, and the second network 600. Similarly, the information processing apparatus 700 can acquire a file of the XML-AIT from the XML-AIT server 400. The information processing apparatus 700 can interpret the acquired XML-AIT to perform control on the application acquired from the application server 300 or the application acquired via the broadcast.

[Application]

Here, the application will be described. The application is provided from the broadcast facility 100 and the application server 300 to the information processing apparatus 700. The application is constituted of, for example, an HTML (Hyper Text Markup Language) document, a BML (Broadcast Markup Language) document, an MHEG (Multimedia and Hypermedia information coding) document, a Java (registered trademark) script, a still-image file, and a moving-image file.

The application may be visible or invisible. A visible application is an application whose state can be seen by a user through a screen. An invisible application is an application whose state cannot be seen by the user through the screen. For example, an application used when a browser is being activated in a transparent state that is invisible to the user, an application to record a viewing time or information for specifying broadcast content viewed in the information processing apparatus and to deliver such viewing time and information to a specific server for the purpose of a rating survey or the like, and the like are conceived.

Further, the application may be a bi-directional-type application capable of changing presented information or function according to an operation of the user of the information processing apparatus 700 or may be an application for uni-directionally presenting information to the user.

[Data Structures of AIT Section and XML-AIT]

Here, the data structure of the AIT transmitted as the AIT section from the broadcast facility 100 and the data structure of the XML-AIT provided from the application server 300 will be described.

FIG. 2 is a diagram showing the data structure of the AIT.

The AIT is a table in which various types of information on applications, application control codes for controlling applications, and the like are stored. Specifically, the AIT stores a table ID, a section syntax indicator, a section length, an application form, a version number, a current next indicator, a section number, a last section number, a common descriptor loop length, an application information loop length, an application identifier, an application control code 11, an application descriptor loop length, an application descriptor 12, and the like. In the application descriptor 12, a randomized latency descriptor that has the purpose of distributing a load to the application server 300 can be described. This randomized latency descriptor will be described later in detail.

FIG. 3 is a diagram showing the data structure of the XML-AIT.

The XML-AIT stores, for each application, an application name, an application identifier, an application descriptor, an application type, an application control code 21, an application visibility, a flag indicating validity in only the current service, an application priority, an application version, a version conforming to a platform profile, an icon, a storage function capability, a transport protocol descriptor, an application location descriptor, an application boundary descriptor, an application specific descriptor, an application usage descriptor, a randomized latency descriptor 22, and the like. The randomized latency descriptor 22 is the same as the randomized latency descriptor that can be described in the application descriptor 12 of the AIT.

In the data structures of the above-mentioned AIT and XML-AIT, the randomized latency descriptor is information newly implemented from the system according to the embodiment of the present technology for the purpose of temporally distributing the load of the application server 300.

FIG. 4 is a diagram showing the data structure of the randomized latency descriptor.

The randomized latency descriptor is constituted of a descriptor tag for identifying the randomized latency descriptor (descriptor tag), a descriptor length (descriptor length), a time range in which access to the application server 300 is distributed (range), a distribution number of an access timing (rate), an absolute time at which the distribution of the access is ended (randomize_end_time), its length (randomize_end_time_length), and the like.

Here, the range (range) and the distribution number (rate) correspond to first information, which is to calculate a random timing for each request for acquiring, from the server, an application that can be processed together with broadcast content.

Further, the absolute time (randomize_end_time) corresponds to second information associated with a valid period of processing based on the first information described above.

[Definition of Application Control Code]

The life cycle of the application is dynamically controlled by the information processing apparatus 700 based on the application control codes 11 and 21 stored in the AIT section and the XML-AIT, respectively.

FIG. 5 is a diagram showing the definitions of the application control codes 11 and 21 stored in the AIT of the AIT section and the XML-AIT.

As shown in the figure, as the application control codes, "AUTOSTART", "PRESENT", "DESTROY", "KILL", "PREFETCH", "REMOTE", "DISABLED", and "PLAYBACK_AUTOSTART" exist in the standard. The definitions of those application control codes are as follows.

The "AUTOSTART" is a code of an instruction to automatically activate the application along with the selection of a service. This is not applied to the case where the application is already in execution.

The "PRESENT" is a code of an instruction to make the application in an executable state while the service is being selected. However, the target application is not automatically activated along with the selection of a service and is activated when an activation instruction is received from the user.

The "DESTROY" is a code of an instruction to permit the termination of the application.

The "KILL" is a code of an instruction to force-quit the application.

The "PREFETCH" is a code of an instruction to perform caching of the application.

The "REMOTE" is a code indicating an application that cannot be acquired in the current transport stream. Such an application can be acquired from a different transport stream or cache to be used.

The "DISABLED" is a code indicating the prohibition of the activation of the application.

The "PLAYBACK_AUTOSTART" is a code for activating an application along with the reproduction of broadcast content recorded in storage (recording apparatus).

[Configuration of First Information Processing Apparatus]

Figure 6:
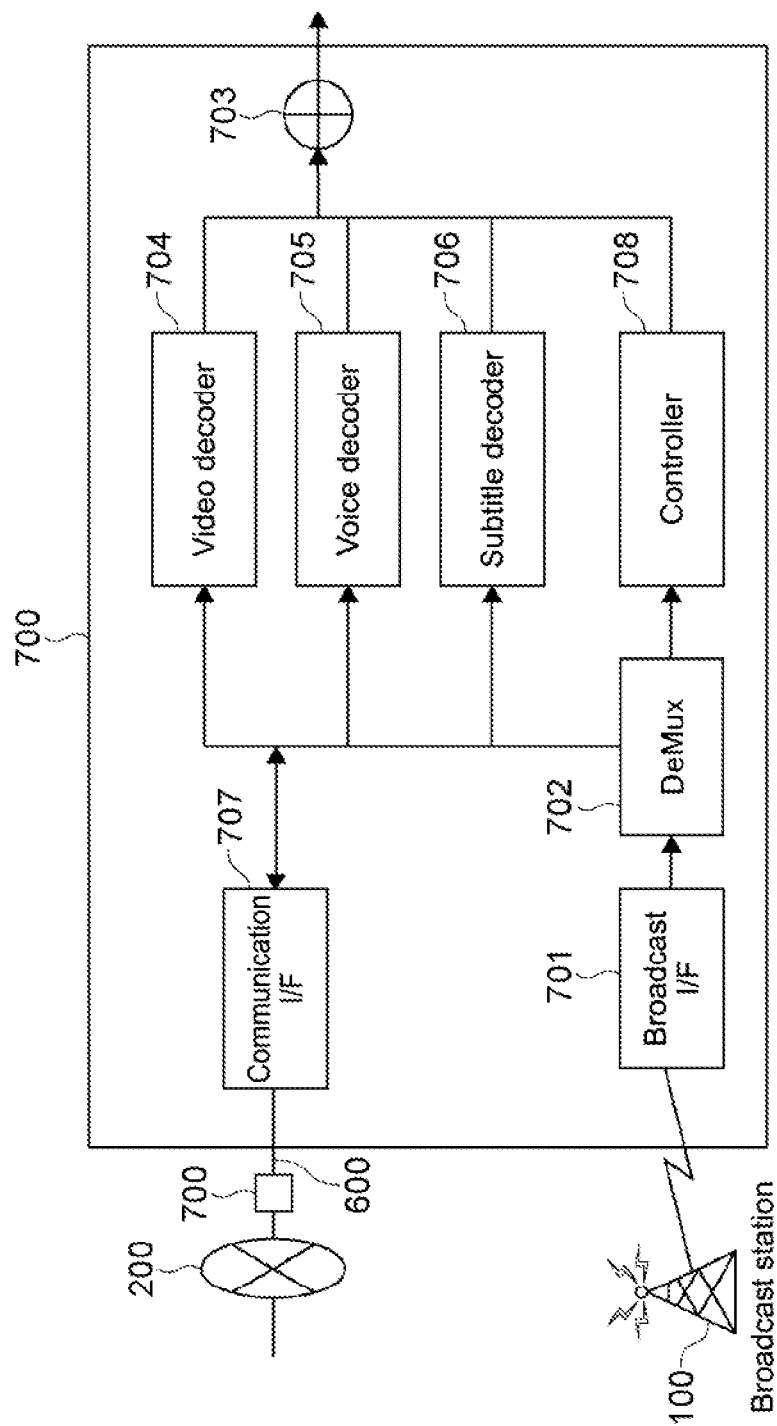
FIG. 6 is a block diagram showing the configuration of an information processing apparatus of this embodiment.

FIG. 6 is a block diagram showing the configuration of the information processing apparatus 700 of this embodiment.

The information processing apparatus 700 includes a broadcast interface 701, a demultiplexer 702, an output processing unit 703, a video decoder 704, a voice decoder 705, a subtitle decoder 706, a communication interface 707, and an application controller 708 (controller).

The broadcast interface 701 includes an antenna and a tuner and receives a signal of digital broadcast whose channel is selected by the user using those antenna and tuner. The broadcast interface 701 outputs a transport stream to the demultiplexer 702. The transport stream is obtained by performing demodulation processing or the like on the received digital broadcast signal.

The demultiplexer 702 separates a stream packet of the broadcast content, a packet of the application, and a packet of the AIT section from the transport stream. The demultiplexer 702 separates a video ES (Elementary Stream), a voice ES, and a subtitle ES from the stream packet of the broadcast content. The demultiplexer 702 delivers the video ES to the video decoder 704, the voice ES to the voice decoder 705, the subtitle ES to the subtitle decoder 706, and the packet of the application and the packet of the PSI/SI including the AIT section to the application controller 708.

The video decoder 704 decodes the video ES to generate a video signal and outputs the generated video signal to the output processing unit 703. The voice decoder 705 decodes the voice ES to generate a voice signal and outputs the generated voice signal to the output processing unit 703.

The subtitle decoder 706 decodes the subtitle ES to generate a subtitle signal and outputs the generated subtitle signal to the output processing unit 703.

The broadcast interface 701, the demultiplexer 702, the output processing unit 703, the video decoder 704, the voice decoder 705, and the subtitle decoder 706 correspond to a broadcast content processing unit that receives and processes the broadcast content.

The communication interface 707 is an interface for communicating with an external device via the second network 600 such as a LAN. The communication interface 707 may perform wireless or wired communication.

The application controller 708 is a controller that performs processing on the control of the application.

The output processing unit 703 combines the video signal from the video decoder 704, the voice signal from the voice decoder 705, the subtitle signal from the subtitle decoder 706, and the video signal, the voice signal, and the like from the application controller 708 with one another and outputs the resultant signal to a recording apparatus (not shown), and a display unit and a speaker unit (not shown), which are connected to the information processing apparatus 700.

A part or the whole of the configuration including at least the application controller 708 of the information processing apparatus 700 described above is constituted of a computer including a CPU (Central Processing Unit) and a main memory and a program.

[Operation of Information Processing System 1]

Next, the operation example of the information processing system 1 of this embodiment will be described in the following order.

1. Typical Operation Example of Activation of Application Based on AIT Section

2. Operation Example of Distribution of Server Access at Time of Using AIT Section 3. Typical Operation Example of Activation of Application Based on XML-AIT 4. Operation Example of Distribution of Server Access at Time of Using XML-AIT (1. Typical Operation Example of Activation of Application Based on AIT Section)

Figure 7:
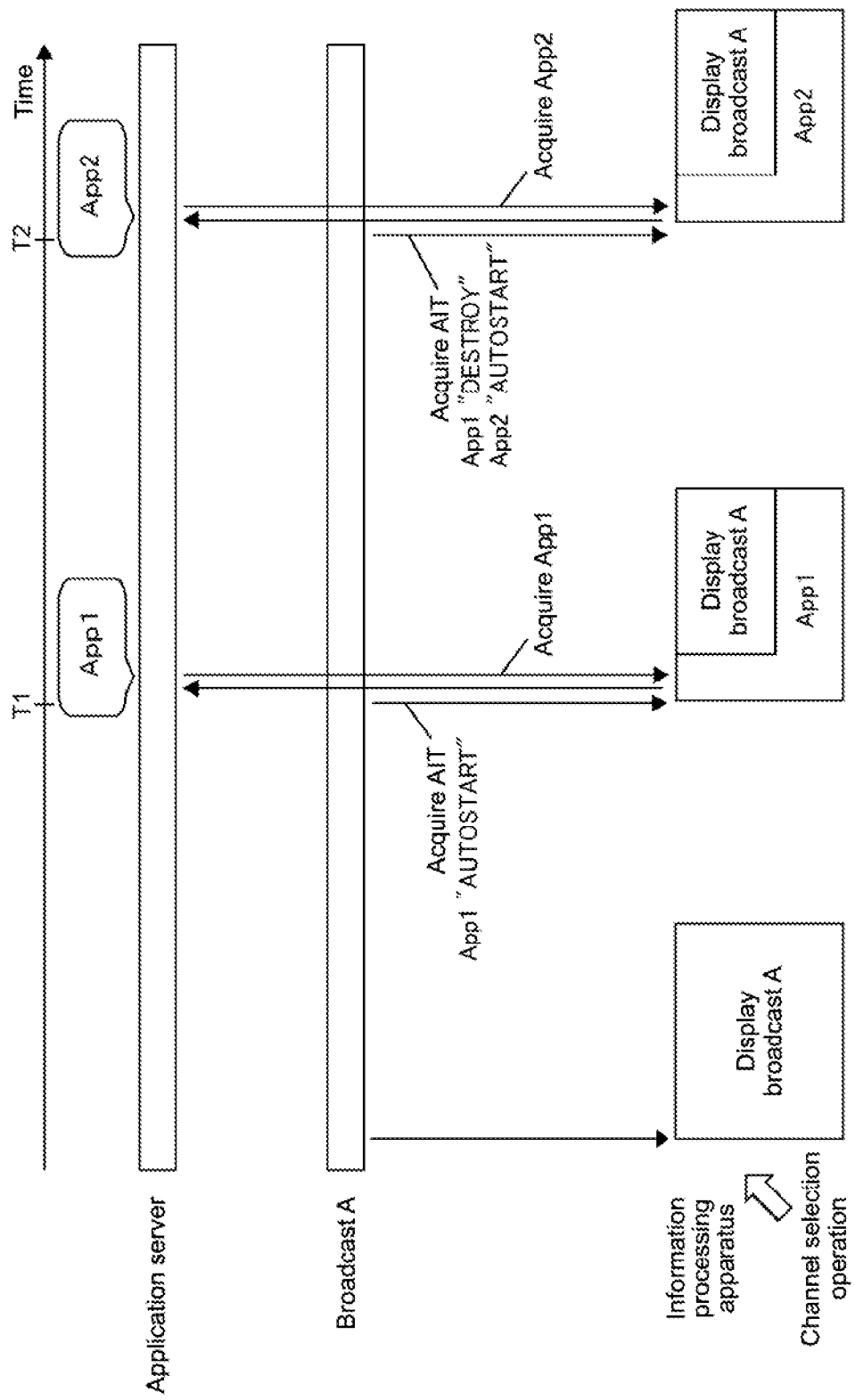
FIG. 7 is a diagram showing the typical operation example of the activation of an application based on the AIT section.

FIG. 7 is a diagram showing the typical operation example of the activation of an application based on the AIT section.

Figure 8:
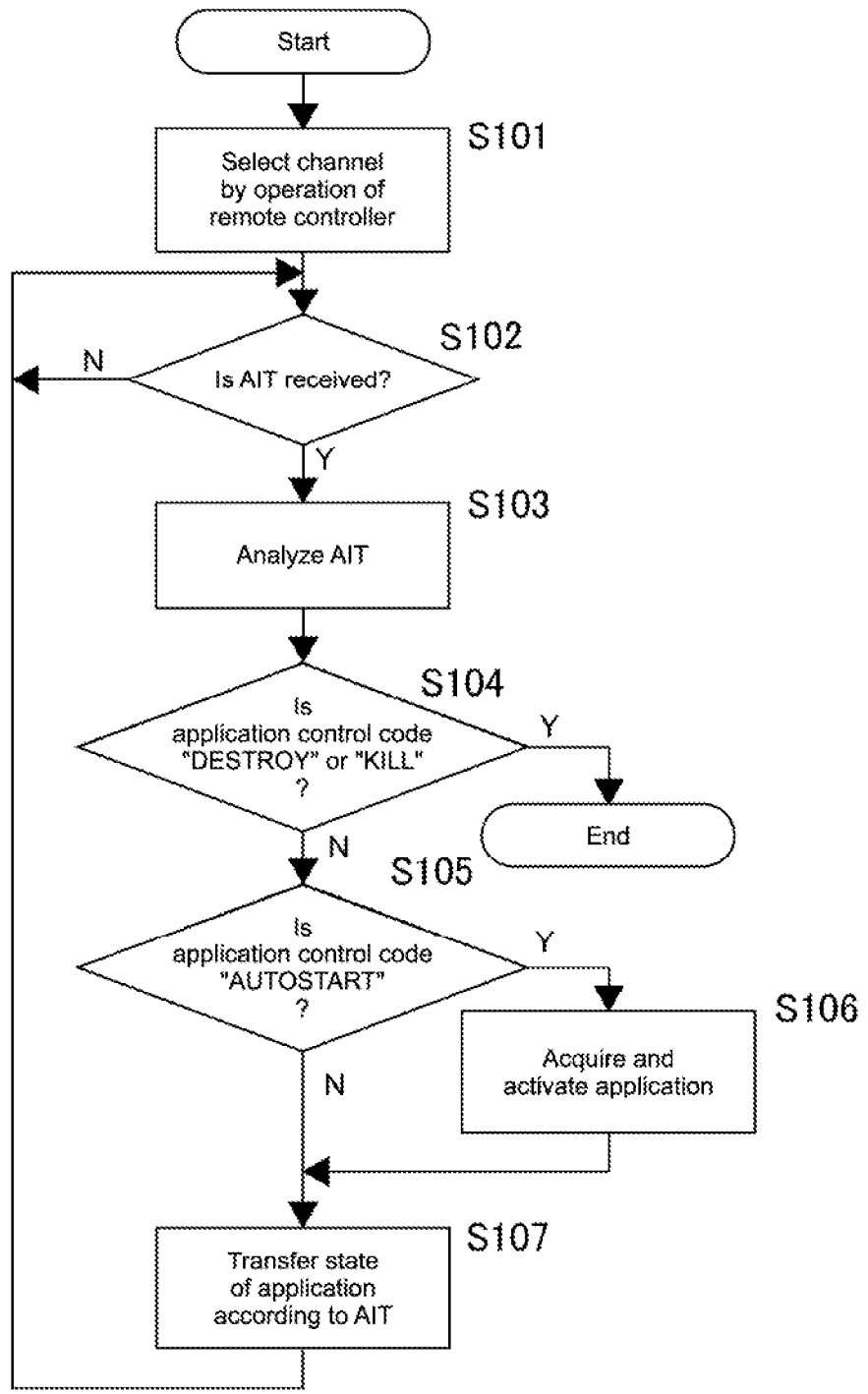
FIG. 8 is a flowchart of the operation example shown in FIG. 7.

FIG. 8 is a flowchart of the operation example shown in FIG. 7.

The information processing apparatus 700 receives broadcast content transmitted from the broadcast facility 100 of a station whose channel is selected by the user by use of a remote controller or the like and performs decoding processing or the like on video data, voice data, subtitle data, and the like to output the broadcast content to the display unit and the speaker unit that are connected to the information processing apparatus 700 (Step S101).

Specifically, the broadcast interface 701 receives a digital broadcast signal of the broadcast content from the broadcast facility 100 of the station whose channel is selected by the user and outputs a transport stream to the demultiplexer 702, the transport stream being obtained by performing demodulation processing or the like on the digital broadcast signal. The demultiplexer 702 separates a stream packet of the broadcast content from the transport stream and further separates the stream packet of the broadcast content into a video ES, a voice ES, and a subtitle ES. The separated video ES, voice ES, and subtitle ES are decoded in the video decoder 704, the voice decoder 705, and the subtitle decoder 706, respectively, and combined in the output processing unit 703 to be output to the display unit and the speaker unit.

In this example, at time T1, an AIT section in which an AIT on an application App1 is stored is superimposed on the broadcast content and transmitted from the broadcast facility 100. In this AIT section, location information of the application App1 and an application control code "AUTOSTART" instructing activation are stored. Here, since it is assumed that the application App1 is acquired from the application server 300, the location information that serves as information necessary for acquiring the application App1 from the application server 300 is constituted of communication protocol information such as HTTP (Hypertext Transfer Protocol), a URL (Uniform Resource Locator), and the like.

The demultiplexer 702 separates a packet of the application App1 and a packet of the AIT section from the transport stream and supplies the separated packets to the application controller 708. When acquiring the AIT section (Step S102), the application controller 708 analyzes the AIT section (Step S103).

In this operation example, since the "AUTOSTART" is described as an application control code in the AIT of the AIT section, the application controller 708 accesses the application server 300 based on the location information described in that AIT section to acquire the application App1 and activates the application App1 (N of Step S104, Y of Step S105, and Step S106). The activated application App1 is visualized (presented) together with the video of a broadcast program A displayed on the display unit, for example.

Subsequently, at time T2, it is assumed that the update of the AIT section occurs. The application controller 708 of the information processing apparatus 700 can be informed of the occurrence of the update of the AIT section based on a version number in the data structure of the AIT section. Here, it is assumed that the application control code "DESTROY" or "KILL" that instructs the termination of the application App1 and the application control code "AUTO-START" that instructs the activation of the next application App2 are described in the updated AIT section.

When acquiring a new AIT section (Step S102), the application controller 708 of the information processing apparatus 700 terminates the application App1 according to the application control code "DESTROY" or "KILL" for the application App1 that is described in this AIT section (Y of Step S104 and End). Further, the application controller 708 acquires an application App2 according to the "AUTO-START" that is stored in the AIT section as an application control code for the application App2 (Y of Step S105 and S106) and activates the application App2 (Step S105). Consequently, the application App2 is presented together with the video of the broadcast program A, instead of the application App1.

It should be noted that in the case where the next application control code other than the "AUTOSTART", the "DESTROY", and the "KILL" is described in the acquired AIT section, after the application controller 708 performs processing such as transferring the state of the application according to that application control code (Step S107), the application controller 708 waits for the next AIT section.

In FIG. 7, although being displayed in an L-shaped form while sharing the area with the video of the broadcast program, each of the application App1 and the application App2 is not necessarily displayed simultaneously with the video of the broadcast program and may be displayed on the entire screen. Further, if each of the application App1 and the application App2 is displayed while sharing the area with the video of the broadcast program, each of the application App1 and the application App2 may be displayed to be separate from the video of the broadcast program vertically or horizontally. In the case where the application is displayed on the entire screen, the video of the broadcast program is not displayed, but also in this state, the tuner of the broadcast interface 701 is in the channel-selected state and the receiving state of the broadcast stream including the AIT section is continued.

As described above, as specific modes of a service in which the application is switched by time and presented by the information processing apparatus 700, for example, the following modes are exemplified.

1. Application for providing, in the case where a moving image showing the whole of a singer's concert is transmitted as a main video through an AV stream, a sub-video obtained by capturing the situation of the concert from a different angle or zooming-in the singer and information on the singer, character data on the concert, and the like.

2. Application for providing voices and subtitles of sports live in languages of various countries.

3. Application of audio description for explaining the details of a video transmitted through an AV stream by voice for a visually impaired person.

(2. Operation Example of Distribution of Server Access at Time of Using AIT Section)

Next, description will be given on a mechanism in which the transmission of acquisition requests for an application from a plurality of information processing apparatuses 700 to the application server 300 is temporally distributed based on the AIT of the AIT section in the information processing system 1 of this embodiment.

Figure 9:
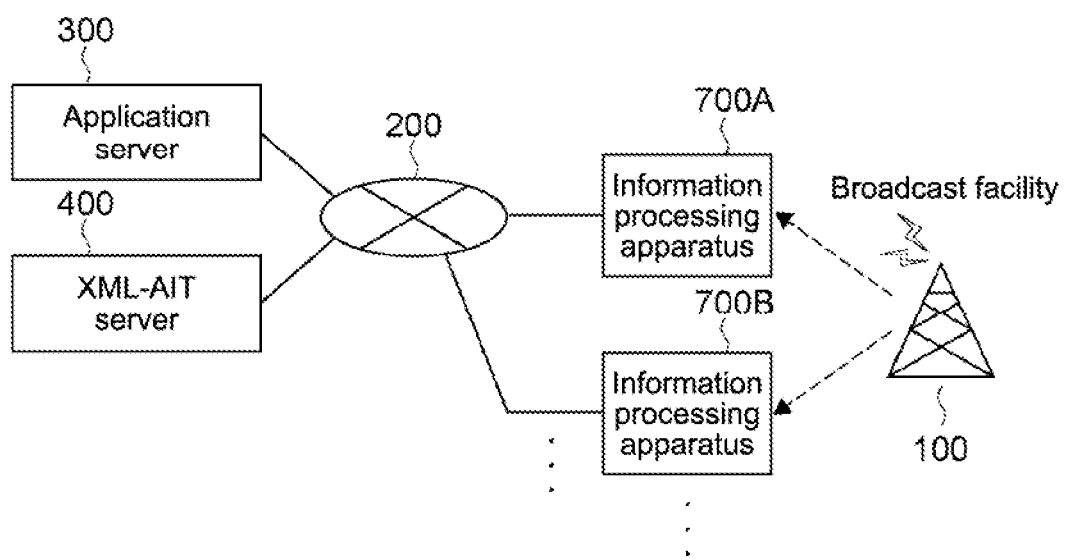
FIG. 9 is a diagram showing the configuration example of the information processing system of this embodiment.

In general, by its nature, the AIT section is received by many information processing apparatuses at the same time or in a very short period of time. As shown in FIG. 9, actually, many information processing apparatuses 700A, 700B, . . . exist in the information processing system 1. So, in the case where each of the information processing apparatuses 700A, 700B, . . . intends to activate an application based on the content described in the AIT of the AIT section, it is thought that the access to the application server 300 to acquire that application is concentrated. When the access to the application server 300 is concentrated and the load of the application server 300 is excessively increased, there is a possibility that a response time is increased and the service is stopped.

In the information processing system 1 of this embodiment, in order to solve such problems, the randomized latency descriptor 22 shown in FIG. 4 is newly implemented, in the AIT of the AIT section, as information for providing a shift to a timing at which each of the information processing apparatuses 700A, 700B, . . . accesses the application server 300 in order to acquire an application.

Figure 10:
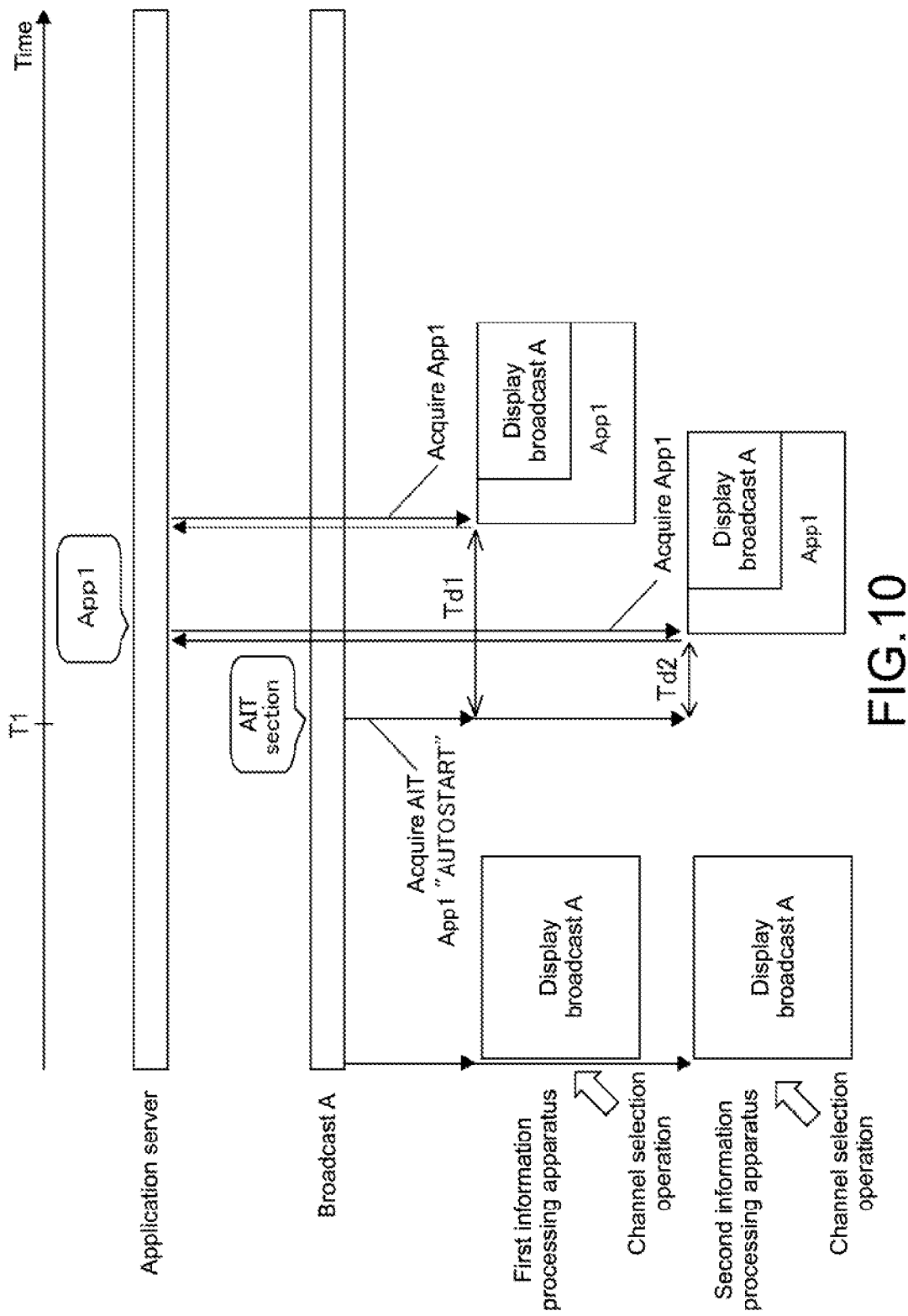
FIG. 10 is a diagram showing the operation example of the distribution of access to the application server at the time of using the AIT section.

FIG. 10 is a diagram showing the operation example of the distribution of access to the application server 300 at the time of using the AIT section, while focusing on the operations of the two information processing apparatuses 700A and 700B shown in FIG. 9.

Figure 11:
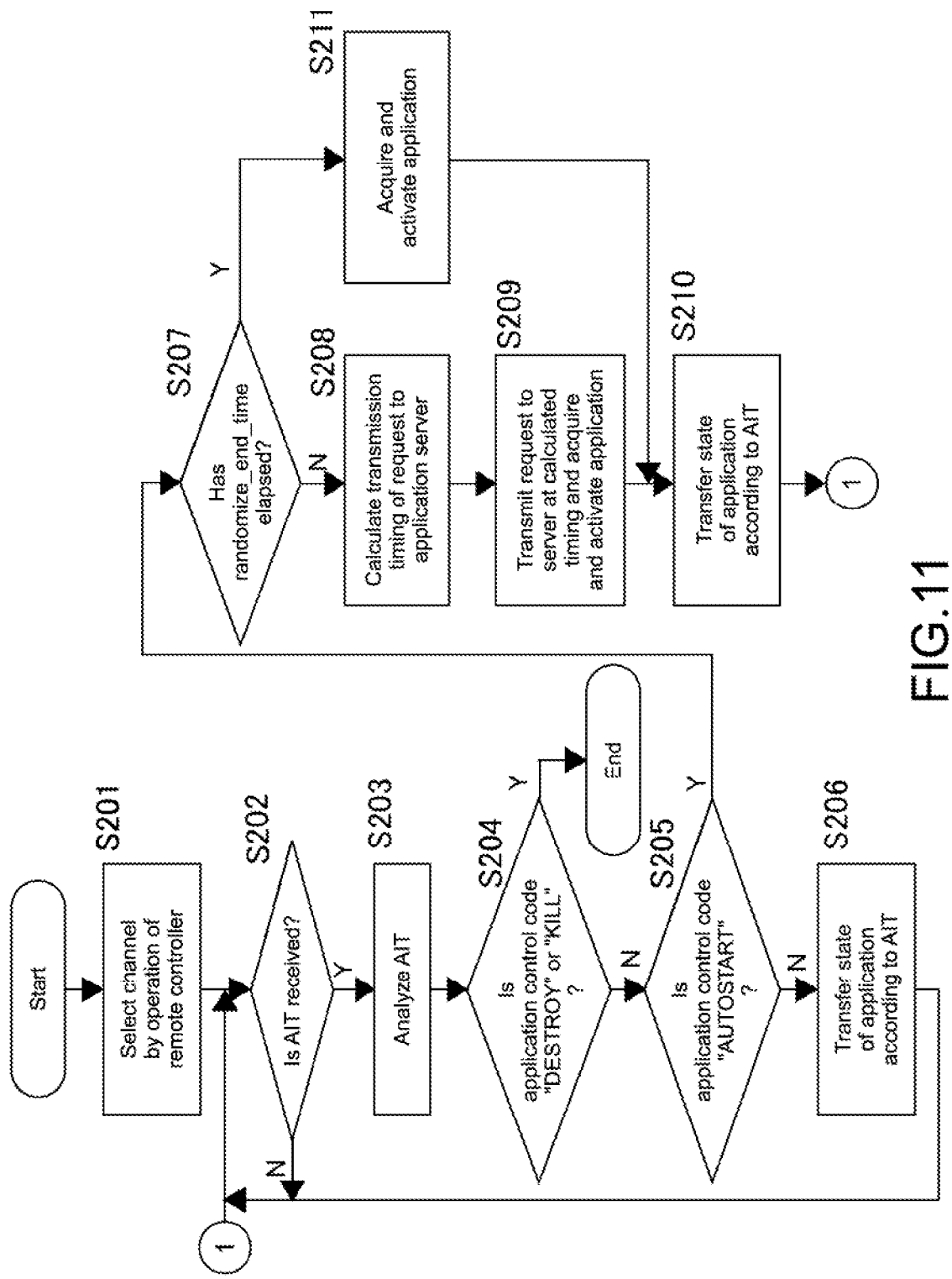
FIG. 11 is a flowchart of the operation example shown in FIG. 10.

FIG. 11 is a flowchart of the operation example shown in FIG. 10.

Hereinafter, one information processing apparatus 700A is referred to as a "first information processing apparatus", and the other information processing apparatus 700B is referred to as a "second information processing apparatus".

It is assumed that both of the first information processing apparatus 700A and the second information processing apparatus 700B select a channel of broadcast A (Step S201) and display the broadcast A on the respective display units.

In this example, at time T1, an AIT section in which an AIT on the application App1 is stored is superimposed on the broadcast content and transmitted from the broadcast facility 100. It is assumed that in this AIT section, location information of the application App1 and an application control code "AUTOSTART" instructing activation are stored.

Each of the first information processing apparatus 700A and the first information processing apparatus 700A receives the AIT section at substantially the same timing (Step S202), analyzes the AIT stored in the AIT section (Step S203), and performs control on the application App1 based on a result of the analysis.

Here, in the case where the application being executed exists and the "DESTROY" or "KILL" is described as an application control code in the AIT (Y of Step S204), the application controller 708 of each of the first information processing apparatus 700A and the first information processing apparatus 700A terminates the application being executed (End).

Further, in the case where the "AUTOSTART" is described as an application control code in the AIT (Y of Step S205), the application controller 708 of each of the first information processing apparatus 700A and the first information processing apparatus 700A starts processing of determining a timing at which an acquisition request for the application to the application server 300 is transmitted based on the randomized latency descriptor 22 described in the AIT. This processing will be described later.

Further, in the case where an application control code other than the "DESTROY", the "KILL", and the "AUTOSTART" is described in the AIT, the application controller 708 transfers the state of the application according to that application control code (Step S206). After that, the application controller 708 enters a standby state for the next AIT section.

Here, the processing of determining a timing at which an acquisition request for the application to the application server 300 is transmitted based on the randomized latency descriptor 22 described in the AIT will be described.

First, the application controller 708 checks if the randomized latency descriptor is described in the AIT of the received AIT section. In the case where the randomized latency descriptor is not described, the application controller 708 executes the application control code "AUTOSTART" described in the AIT. That is, the application controller 708 transmits the acquisition request for the application to the application server 300 as quickly as possible. Consequently, in this case, the temporal distribution of the access to the application server 300 is not performed.

In the case where the randomized latency descriptor is described in the AIT, the application controller 708 compares the absolute time (randomize_end_time) in the randomized latency descriptor 22 with the current time, the absolute time indicating a time at which the distribution of the access is ended, and determines whether the absolute time (randomize_end_time) has elapsed at the current time (Step S207). As a result of the determination, in the case where the absolute time (randomize_end_time) has elapsed at the current time (Y of Step S207), the application controller 708 executes the application control code "AUTOSTART" described in the AIT (Step S211). That is, after the time indicated by the absolute time (randomize_end_time), the temporal distribution of the transmission of the acquisition request for an application to the application server 300 is not performed. On the other hand, in the case where the absolute time (randomize_end_time) has not elapsed at the current time (Y of Step S207), in order to perform the temporal distribution of the transmission of the acquisition request for an application to the application server 300, the application controller 708 calculates a timing of the transmission of the acquisition request for an application to the application server 300 as follows (Step S208).

First, the application controller 708 extracts a distribution number (rate) of an access timing from the randomized latency descriptor 22 of the received AIT and determines one integer value N at random from the values including 1 to the values of (rate+1). Subsequently, the application controller 708 extracts a value of a time range (range) in which the access to the application server 300 is distributed, from the randomized latency descriptor 22 of the received AIT. The application controller 708 uses the following expression (1) to calculate a transmission timing (LatencyPeriod) of the acquisition request for an application based on the integer value N and the range (range).

$$\text{LatencyPeriod} = (N-1) \times \text{range} / \text{rate} \quad (1)$$

Here, the LatencyPeriod calculated in the first information processing apparatus 700A corresponds to Td1 of FIG. 10, and the LatencyPeriod calculated in the second information processing apparatus 700B corresponds to Td2 of FIG. 10. Consequently, from each of the first information processing apparatus 700A and the second information processing apparatus 700B, 3 shifts are ensured at high probability for the timing at which the acquisition request for an application is transmitted.

It should be noted that here, the above-mentioned randomized latency descriptor and the calculation method based on the randomized latency descriptor have been exemplified, but the present technology is not limited to the exemplified ones. If a shift can be provided to the transmission timing of the acquisition requests for an application from a plurality of information processing apparatuses, any descriptor and calculation method may be adopted. Further, although it is assumed that the transmission timing of the acquisition request for an application is distributed only in a period of time during which the absolute time (randomize_end_time) in the randomized latency descriptor 22 has not elapsed at the current time, an upper-limit elapse time from the acquisition timing of the XML-AIT may be adopted instead of the absolute time (randomize_end_time).

After that, the application controller 708 of each of the first information processing apparatus 700A and the second information processing apparatus 700B transmits the acquisition request for an application to the application server 300 at a timing calculated in each application controller 708. The application server 300 returns a corresponding application App1 to each acquisition request for an application. Upon acquisition of the application App1, the application server 300 of each of the first information processing apparatus 700A and the second information processing apparatus 700B activates the application App1 according to the application control code "AUTOSTART" described in the AIT (Step S209).

Subsequently, in the case where the next application control code other than the "AUTOSTART" described in the AIT of the acquired AIT section is described, the application controller 708 transfers the state of the application App1 according to that application control code (Step S210). After that, the application controller 708 enters a standby state for the next AIT section.

(3. Typical Operation Example of Activation of Application Based on XML-AIT)

Next, the typical operation example of the activation of the application based on the XML-AIT acquired by the communication such as the Internet will be described.

Figure 12:
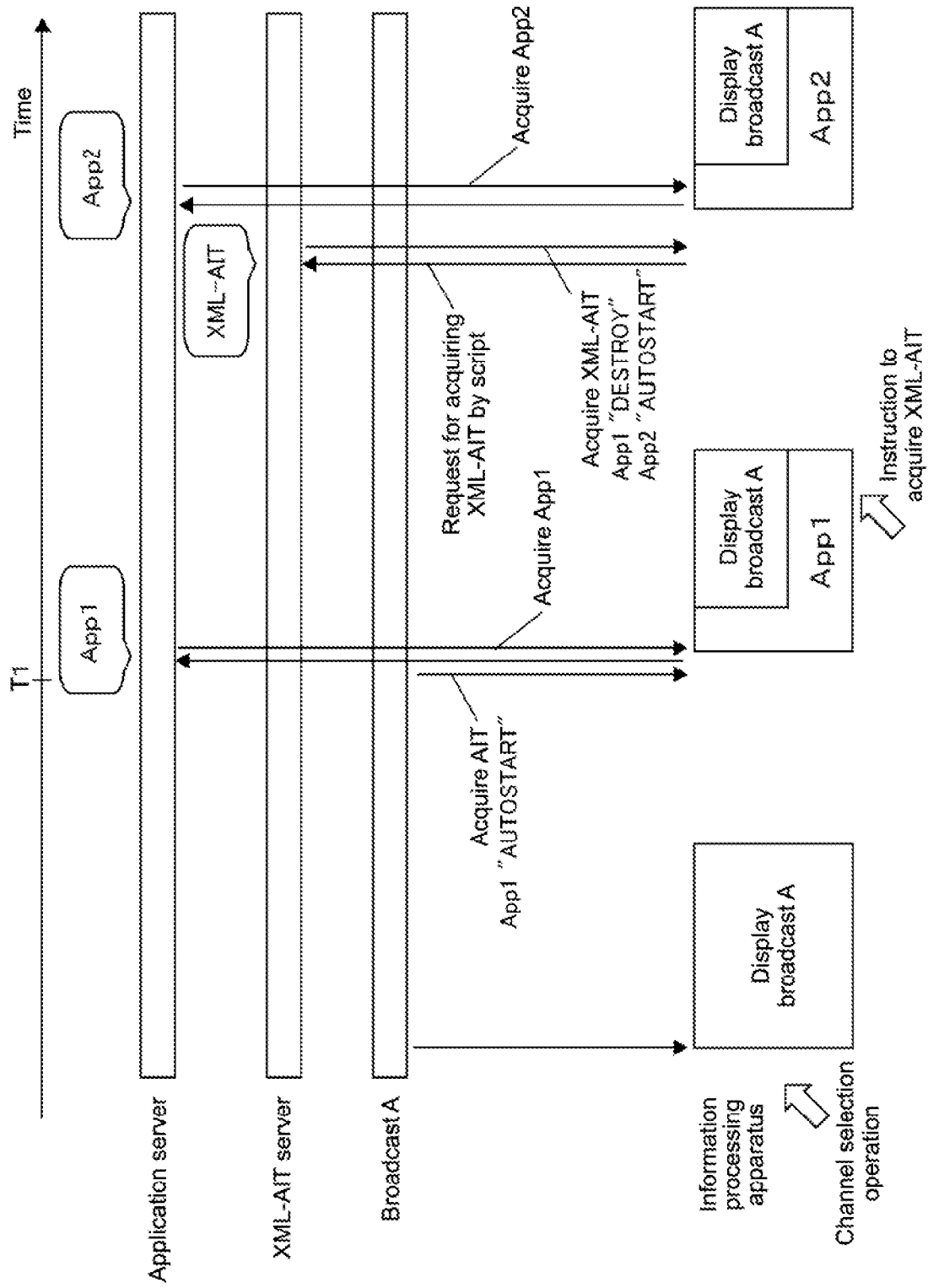
FIG. 12 is a diagram showing the typical operation example of the activation of an application by using the XML-AIT.

FIG. 12 is a diagram showing the typical operation example of the activation of an application by using the XML-AIT.

Figure 13:
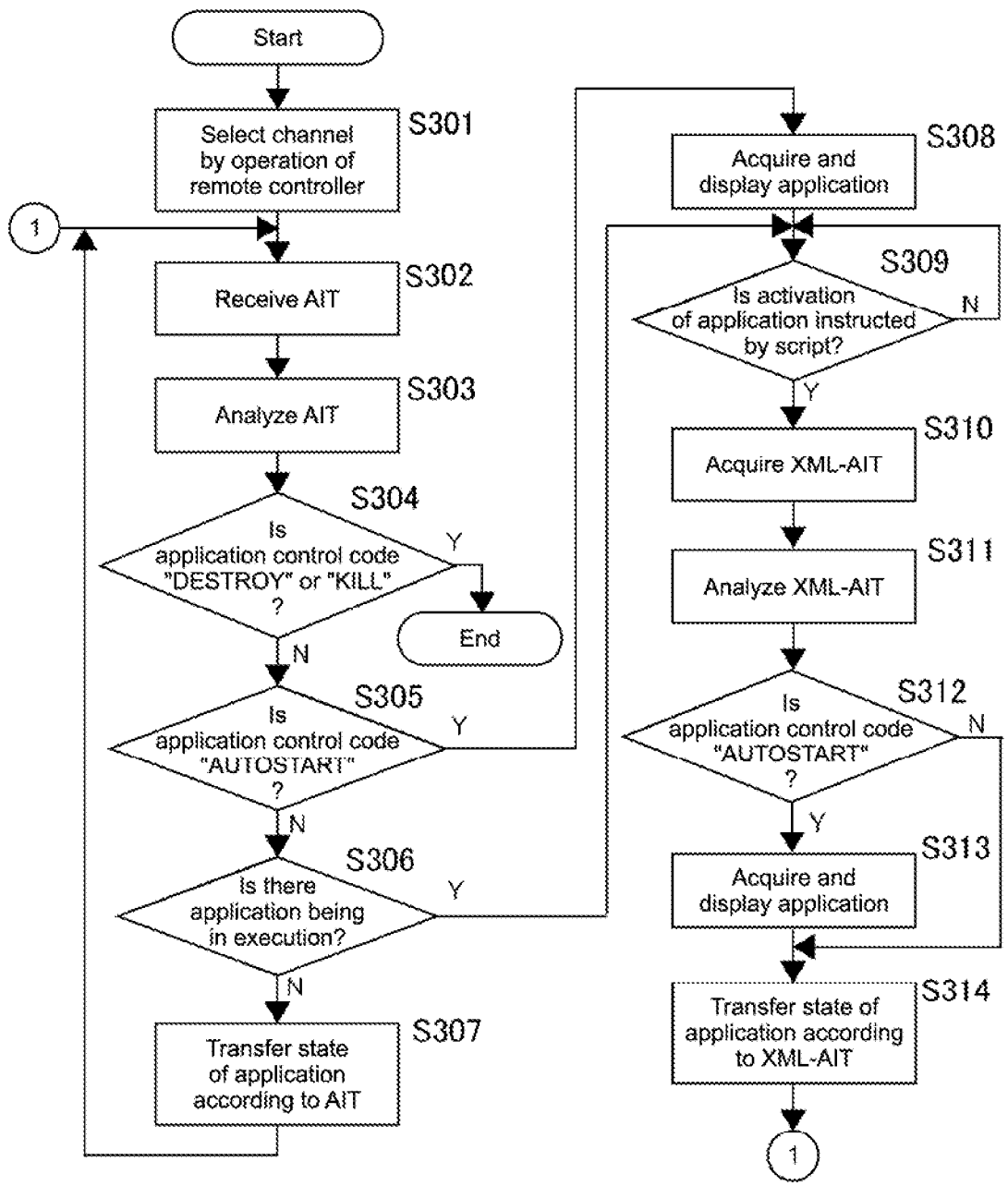
FIG. 13 is a flowchart of the operation example shown in FIG. 12.

FIG. 13 is a flowchart on the operation example shown in FIG. 12.

In this operation example, the operation from the channel selection of broadcast by an operation of a user using a remote controller to the control of the application based on the AIT section is basically the same as in "1. Typical Operation Example of Activation of Application Based on AIT Section".

In this operation example, it is assumed a case where a script containing a createApplication( ) function and the like for causing the information processing apparatus 700 to acquire the XML-AIT for an application App2 to be presented next is incorporated in the application App1 being presented. In the createApplication( ) function, information on a communication protocol that is necessary to access the XML-AIT for the application App2, location information of the XML-AIT, and the like are described as parameters.

In each of the first information processing apparatus 700A and the first information processing apparatus 700A, during the presentation of the application App1, when a predetermined condition such as an instruction from the user or time is established (Y of Step S309), the above-mentioned script incorporated in the application App1 is executed, and thus the application controller 708 acquires a new XML-AIT from the XML-AIT server 400 (Step S310) and analyzes the new XML-AIT (Step S311).

It is assumed that in this new XML-AIT, the application control code "DESTROY" or "KILL" that instructs the termination of the application App1 and the application control code "AUTOSTART" that instructs the activation of the application App2 are described.

In each of the first information processing apparatus 700A and the first information processing apparatus 700A, according to the application control code "DESTROY" or "KILL" for the application App1 that is described in the XML-AIT, the application controller 708 terminates the application App1 (Step S314). Furthermore, according to the application control code "AUTOSTART" for the application App2 that is described in the XML-AIT (Y of Step S312), the application controller 708 acquires the application App2 from the application server 300 based on the location information of the application App2 described in that XML-AIT and activates the application App2 (Step S313).

Subsequently, the application controller 708 transfers the state of the application App2 according to the next application control code described in the XML-AIT (Step S314). After that, the application controller 708 enters a standby state for the next AIT section.

(4. Operation Example of Distribution of Server Access at Time of Using XML-AIT)

Next, description will be given on an operation in which the transmission of acquisition requests for an application from the plurality of information processing apparatuses 700 to the application server 300 is temporally distributed based on the XML-AIT in the information processing system 1 of this embodiment.

The XML-AIT is transmitted to the information processing apparatus 700 by communication via the Internet. For that reason, as compared with the AIT section, a probability that the temporal concentration of the load of the application server 300 occurs is low. However, it is assumed a case where a script that contains a createApplication( ) function and the like and is incorporated in the application (for example, the application App1 described above) whose life cycle is controlled by the AIT of the AIT section is simultaneously executed on the plurality of information processing apparatuses 700 depending on temporal conditions such as the absolute time. Also in such a case, it is thought that the plurality of information processing apparatuses 700 transmit the acquisition requests for an application to the application server 300 at substantially the same time and the load of the application server 300 is increased.

In this regard, in the information processing system 1 of this embodiment, the randomized latency descriptor 22 shown in FIG. 4 is newly implemented also in the XML-AIT.

Figure 14:
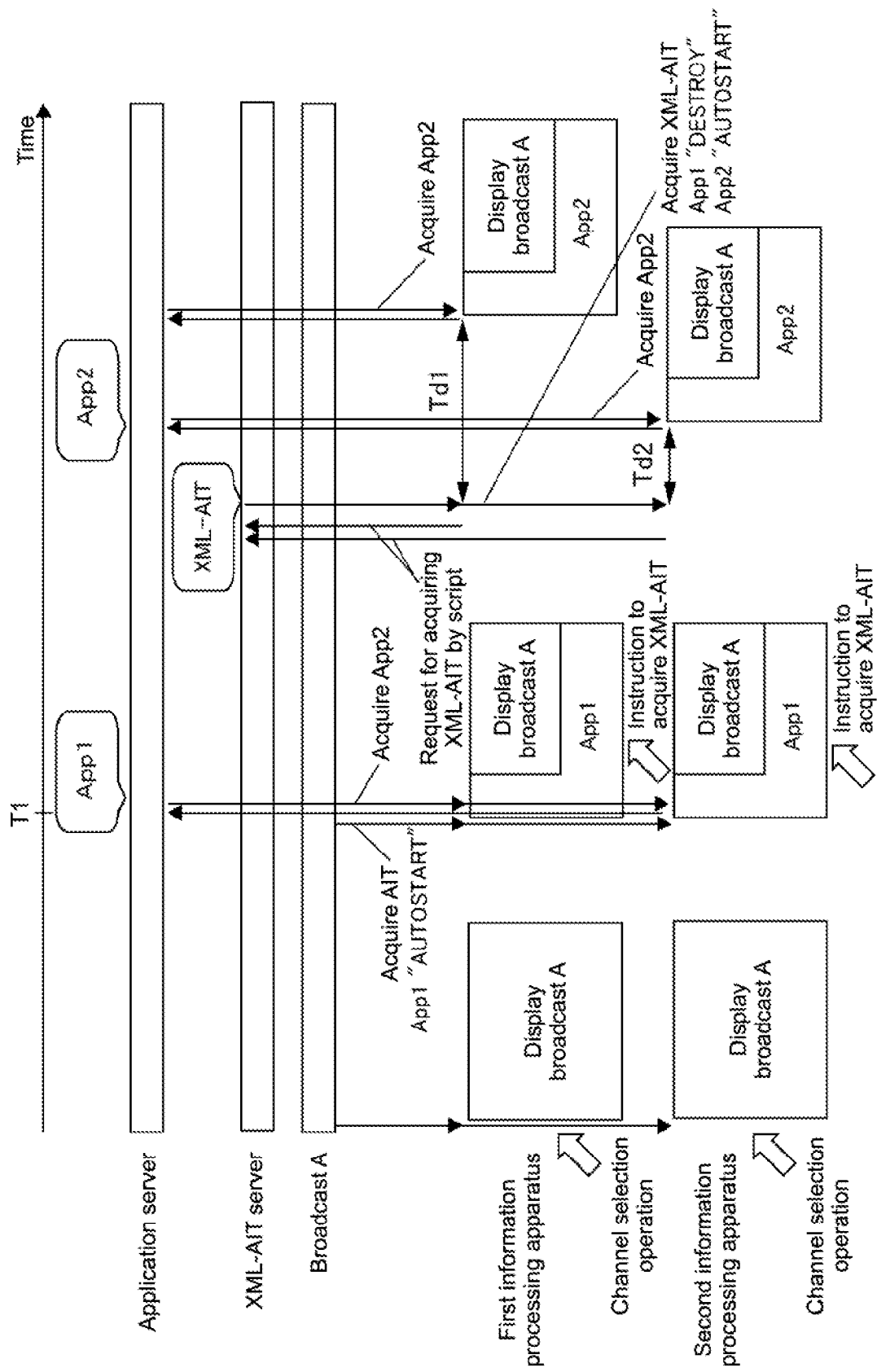
FIG. 14 is a diagram showing the operation example of the distribution of access to the application server 300 at the time of using the XML-AIT.

FIG. 14 is a diagram showing the operation example of the distribution of access to the application server 300 at the time of using the XML-AIT.

FIG. 15 is a flowchart of the operation example shown in FIG. 14.

In this operation example, an operation in which the transmission of acquisition requests for an application from the plurality of information processing apparatuses 700 to the application server 300 is temporally distributed based on the XML-AIT is basically the same as the operation based on the AIT of the AIT section.

Also in this operation example, it is assumed a case where a script containing a createApplication( ) function and the like for causing the information processing apparatus 700 to acquire the XML-AIT for an application App2 to be presented next is incorporated in the application App1 being presented.

In each of the first information processing apparatus 700A and the first information processing apparatus 700A, during the presentation of the application App1, when a predetermined condition such as an instruction from the user or time is established (Y of Step S409), the above-mentioned script incorporated in the application App1 is executed, and thus the application controller 708 acquires a new XML-AIT from the XML-AIT server 400 (Step S410) and analyzes the new XML-AIT (Step S411).

It is assumed that in this new XML-AIT, the application control code "DESTROY" or "KILL" that instructs the termination of the application App1 and the application control code "AUTOSTART" that instructs the activation of the application App2 are described.

In each of the first information processing apparatus 700A and the first information processing apparatus 700A, according to the application control code "DESTROY" or "KILL" for the application App1 that is described in the XML-AIT, the application controller 708 terminates the application App1 (Step S417).

Further, in the case where the "AUTOSTART" is described as an application control code for the application App2 in the XML-AIT (Y of Step S412), the application controller 708 calculates a timing of the transmission of the acquisition request for an application to the application server 300 based on the randomized latency descriptor 22 described in the acquired XML-AIT (Step S415). A specific method of calculating the timing is as described in "2. Operation Example of Distribution of Server Access at Time of Using AIT Section". Consequently, from each of the first information processing apparatus 700A and the second information processing apparatus 700B, a shift is ensured for the timing at which the acquisition request for an application is transmitted.

After that, the application controller 708 of each of the first information processing apparatus 700A and the second information processing apparatus 700B transmits the acquisition request for an application to the application server 300 at a timing calculated in each application controller 708. The application server 300 returns a corresponding application App2 to each acquisition request for an application. Upon acquisition of the application App2, the application server 300 of each of the first information processing apparatus 700A and the second information processing apparatus 700B activates the application App2 according to the application control code "AUTOSTART" described in the AIT (Step S416).

Subsequently, in the case where the next application control code other than the "AUTOSTART" described in the AIT of the acquired AIT section is described, the application controller 708 transfers the state of the application App1 according to that application control code (Step S417). After that, the application controller 708 enters a standby state for the next AIT section.

Effects etc. of Embodiment

In this embodiment, the following effects are obtained.

1. Due to the implementation of the randomized latency descriptor 22 in the AIT of the AIT section and the XML-AIT, the timing of the transmission of acquisition requests for an application to the application server 300 from the plurality of information processing apparatuses 700 can be distributed. Consequently, for example, the load of the application server 300 immediately after the AIT section and the XML-AIT are delivered can be temporally distributed, and the responsiveness and availability of the application server 300 can be improved.

2. With the descriptor of the absolute time (randomize_end_time) in the randomized latency descriptor 22, a period of time in which processing for temporally distributing access to the application server 300 is performed (valid period) can be arbitrarily set.

The embodiment in which the standard of the HbbTV is assumed has been described, but the present technology is not limited to the assumption of the standard of the HbbTV.

In addition to the above, the present technology is not limited to the above-mentioned embodiment and can be variously modified without departing from the gist of the present invention as a matter of course.

DESCRIPTION OF REFERENCE NUMERALS 1 information processing system
100 broadcast facility
101 supply unit
300 application server
400 XML-AIT server
401 supply unit
700 information processing apparatus
701 broadcast interface
702 demultiplexer
703 output processing unit
704 video decoder
705 voice decoder
706 subtitle decoder
707 communication interface
708 application controller

The invention claimed is:

1. An information processing apparatus, comprising:
a memory configured to store an application information table; and
circuitry configured to
receive and process broadcast content,
acquire the application information table for an application which is capable of being processed together with the broadcast content and is to be acquired from a server, the application information table storing first information, and the first information including a distribution number of an access timing of the application to be acquired from the server and including a time range in which access to the server is distributed, and
calculate, based on the time range and the distribution number included in the first information, a random timing at which a request for acquiring the application is transmitted.

2. The information processing apparatus according to claim 1, wherein
in the application information table, second information on a valid period of processing based on the first information is stored, and
the circuitry is configured to determine, based on the second information, on or off of execution of the processing based on the first information.

3. The information processing apparatus according to claim 2, wherein
the circuitry is configured to determine whether the valid period of the processing has elapsed or not based on the second information, and when the valid period has elapsed, transmit the request for acquiring the application with a timing that is not based on the first information.

4. An information processing method, comprising:
receiving and processing, by circuitry of an information processing apparatus, broadcast content;
acquiring, by the circuitry, an application information table for an application which is capable of being processed together with the broadcast content and is to be acquired from a server, the application information table storing first information, and the first information including a distribution number of an access timing of the application to be acquired from the server and including a time range in which access to the server is distributed; and
calculating, based on the time range and the distribution number included in the first information, a random timing at which a request for acquiring the application is transmitted.

5. A non-transitory computer-readable medium having stored thereon, a set of computer-executable instructions for causing a computer to perform a method comprising:
receiving and processing broadcast content;
acquiring an application information table for an application which is capable of being processed together with the broadcast content and is to be acquired from a server, the application information table storing first information, and the first information including a distribution number of an access timing of the application to be acquired from the server and including a time range in which access to the server is distributed; and
calculating, based on the time range and the distribution number included in the first information, a random timing at which a request for acquiring the application is transmitted.

6. An application information table supplying apparatus, comprising:
a memory configured to store an application information table; and
circuitry configured to supply the application information table to an information processing apparatus, for an application which is capable of being processed together with broadcast content and is to be acquired from a server, the application information table storing first information for the information processing apparatus to calculate, based on the first information, a random timing at which a request for acquiring the application is transmitted based on the first information,
the first information including a distribution number of an access timing of the application to be acquired from the server and including a time range in which access to the server is distributed, and
the random timing calculated based the time range and the distribution number.

7. An application information table supplying method, comprising:
supplying, by circuitry of an application information table supplying apparatus, an application information table to an information processing apparatus, for an application which is capable of being processed together with broadcast content and is to be acquired from a server, the application information table storing first information for the information processing apparatus to calculate, based on the first information, a random timing at which a request for acquiring the application is transmitted, the first information including a distribution number of an access timing of the application to be acquired from the server and including a time range in which access to the server is distributed, and the random timing calculated based the time range and the distribution number.

8. The information processing apparatus according to claim 1, wherein the circuitry is configured to acquire the application based on location information of the application stored in the application information table.

9. The information processing apparatus according to claim 1, further comprising:
   a television receiver configured to receive a digital broadcast signal that includes the application information table.

10. The application information table supplying apparatus according to claim 6, further comprising:
    a transmitter configured to transmit a digital broadcast signal including the application information table.

11. The information processing apparatus according to claim 1, wherein the calculated random timing is further based on a ratio between the time range and the distribution number.

* * * * *